United States Patent
Van Rens

(10) Patent No.: US 7,059,533 B2
(45) Date of Patent: Jun. 13, 2006

(54) AUTHENTICATION USING A READ-ONCE MEMORY

(75) Inventor: Bas Jan Emile Van Rens, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/514,021

(22) PCT Filed: Apr. 11, 2003

(86) PCT No.: PCT/IB03/01623

§ 371 (c)(1),
(2), (4) Date: Nov. 6, 2004

(87) PCT Pub. No.: WO03/096288

PCT Pub. Date: Nov. 20, 2003

(65) Prior Publication Data

US 2005/0173540 A1    Aug. 11, 2005

(30) Foreign Application Priority Data

May 8, 2002    (EP)    ................................. 02076812

(51) Int. Cl.
*G06K 19/06*    (2006.01)
(52) U.S. Cl. ..................................................... 235/492
(58) Field of Classification Search ................ 235/375, 235/380, 382, 382.5, 451, 492, 493
See application file for complete search history.

(56) References Cited

U.S. PATENT DOCUMENTS

| | | | | | |
|---|---|---|---|---|---|
| 4,887,234 | A * | 12/1989 | Iijima | .......................... | 711/173 |
| 5,148,543 | A * | 9/1992 | Tamada et al. | ............. | 713/200 |
| 5,796,092 | A * | 8/1998 | Nagata et al. | .............. | 235/492 |
| 5,825,875 | A * | 10/1998 | Ugon | .......................... | 705/65 |
| 5,950,013 | A * | 9/1999 | Yoshimura et al. | ............ | 710/5 |
| 6,747,546 | B1 * | 6/2004 | Hikita et al. | ............. | 340/10.31 |
| 6,772,955 | B1 * | 8/2004 | Yoshimoto et al. | ......... | 235/492 |
| 6,824,045 | B1 * | 11/2004 | Yap et al. | .................... | 235/375 |
| 7,014,119 | B1 * | 3/2006 | Sterling | ...................... | 235/487 |

FOREIGN PATENT DOCUMENTS

| | | | |
|---|---|---|---|
| FR | 2 796 742 | | 1/2001 |
| FR | 2 804 226 | | 4/2001 |

* cited by examiner

*Primary Examiner*—Thien M. Le
*Assistant Examiner*—Jamara A. Franklin
(74) *Attorney, Agent, or Firm*—Adam L. Stroud

(57) ABSTRACT

The device comprises a memory (10) with a first section (11) and a second section (12). The second section (12) can be read only after erasure of the first section (11). The memory is suitable for authentication purposes, in that the first section (11) contains a first code part and the second section contains a second code part of an identification code. The device is preferably an semiconductor device and can be integrated in articles and in record carriers.

11 Claims, 3 Drawing Sheets

AUTHENTICATION USING A READ-ONCE MEMORY

The invention relates to a system comprising a memory provided with a first and a second section, each with a number of memory elements, which memory is suitable for storing an identification code that is once readable for authentication purposes.

The invention also relates to a method of authentifying an article, that is provided with an identification code stored in a memory, wherein a reader compares the identification code in the memory of the system with at least one reference code.

Such a system and such a method are known from U.S. Pat. No. 5,032,708. The known system is a semiconductor device which has a write-once-read-once memory with fuses as memory elements. The fuses indicate the status of a particular bit in either of two memory arrays, one of which memory arrays is directly readable and one is encrypted. To check the authenticity of the system, a reader generates a random bit sequence, according to which a number of elements of both memory arrays are read. The random bit sequence then determines for each bit read from the memory arrays, whether the directly readable or the encrypted bit is passed on to the reader. Before the data in an element comes available to the reader, the element and the corresponding element in the encrypted array are destructed. The response is compared to an expected response sequence, that has been supplied to the reader from the encrypted memory array.

It is a disadvantage of the known device that a malicious person can find out the encryption mechanism by supplying a non-random bit sequence to the semiconductor device resulting in a systematic comparison of the encrypted array with the directly readable array. This would allow the manufacturing of fake articles while even the authentication procedure states that the articles are authentic. Alternatively, it would allow access to the article (for instance with software) or to a location (for instance with a swimming pool) multiple times, whereas access is allowed only once.

It is therefore a first object of the invention to provide a system of the kind mentioned in the opening paragraph with an improved memory for identification and/or authentication purposes.

The first object is realized in that the first section and the second section are connected in series with connection means between them, the first section being suitable for storing a first code part of the identification code and the second section being suitable for storing a second code part of the identification code, and the connection means provide access to the second section only if the first code part in the first section has been erased.

The invention offers an improved memory for authentication both for the case of the stand-alone authentication system and for the case of the system including a connection to a central database. The insight of the invention is that in effect a plurality of identification codes can be read out, only one of which will provide the authentication at a certain instance. In any other non-authenticating read-out either the first section or the second section is not accessible. Instead some random or standard digits will be read out. However, there is only one opportunity for consecutive reading of the first code part and the second code part, since the second section of the memory can be accessed only after erasure of the first code part from the first section.

In fact, the memory is not a read-once memory, but a memory with a certain part that can be read only once. This part is the combination of the first and second sections of the memory, wherein the identification code is to be stored. Both the first and the second sections can be read-once or read-many in itself. In order to increase the security, it is preferred that at least a part of the subsection is read-once.

The system of the invention has—with its memory of which at least some can be read more often—the advantage in comparison to the prior art, that several persons can do an authentication independently. If for instance the first section of the memory can be read more often, a reseller can assess whether the products to be sold are original or counterfeited products. He can do so, without obtaining the complete identification code, and thus, without using the authenticate-once measure. The difference between the reading of the first section only and the authentication may be made through an algorithm supplied by the reader. Besides, a consumer can check the authenticity independently as well, through the use of the second section of the memory. Both the reseller and the consumer can get a reference code via the internet. The reseller may also be provided a list with reference codes. A system to enable contact to an information database, for instance a specific page on the internet, with the help of a transponder, is known from WO-A 01/26320.

At the same time, the system of the invention offers advantages to a producer of an authentic product or an owner of a service as well. First of all, the independent authentication by several persons—e.g. the reseller and the customer—allows the authentic producer of a product to get knowledge about the customers. Secondly, the fact that not the complete identification code is destroyed offers the possibility to establish a connection between the semiconductor device (and hence the user) and a central database of the authentic producer or service owner, after the first authentic use of the semiconductor device. For instance, if a piece of software is installed at a second instance, the second portion may establish a connection to the database of the software producer, providing the computer address. A message can be returned stating that further use is not allowed or only after additional payment, or stating that a new version of the software is available.

In a first embodiment of the system of the invention the first code part in the first section can be read once only and the second code part in the second section can be read more often. The system has the advantage, that a consumer can be the first one to do a read-out. It is for instance advantageous if the system is used as a security for one-time usuable goods or data, such as software or credits, for example for telephone cards. With this embodiment, the second section can be used for a separate identification procedure. Preferably the system is encorporated in a semiconductor device and comprises an antenna Such a semiconductor device with antenna is also known as an transponder.

In a second embodiment of the system, the first code part in the first section can be read more often and the second code part in the second section can be read once, and the memory comprises a third section, that is accessible only after the first code part in the first section has been erased and that can be read more often. In this embodiment the first section can be read more often, and also the second set of memory elements of the second section can be read more often. This embodiment is suitable for the provision of a triple authorisation.

A further version of this embodiment is that the memory is for the largest part a read-many memory, and that the first and second section are integrated therein. If then the second section contains read-once elements, instead of the first section, the read-once memory is hidden effectively: only if the reader is provided with a signal to start the authenticating reading, the second section will be entered. Before that, it is not visible.

This further version has as a first advantage that it is more difficult to trace the read-once memory. It is a second advantage that the read-once memory may be used as an additional security feature. Such a memory is well suited to check a specific use of articles that are widespread available, as for instance banknotes or other security documents. Dependent on a signal from the reader the first code part may be erased from the first section to enable reading of the data in the second and third section. If for instance the signal is given after a certain moment of time, all banknotes that are read out will have the identification code with the second section. Thus it can be identified how long a banknote has not circulated in the normal circuit. Alternatively, this could be used as an additional security feature, since the type of identification codes used changes suddenly.

The system of the invention can be any kind of system comprising a memory.

Basically, the system can be a single device incorporating memory and connection means. A preferred example thereof is a semiconductor device. In this case the connection means are any type of switch, wherein the position of the switch is dependent on input from the first section, in particular on the status of at least some of the memory elements thereof. In a preferred embodiment, the connection means comprise an AND-function. As any skilled person will understand, the AND-function may also be implemented with NAND-structures.

It is advantageous if an antenna is present to communicate contactlessly with a reader. The semiconductor device and the antenna may be designed so as to form a transponder. This transponder, per se known by the skilled person, can be operated without a battery. Transponders can be provided in the form of labels, or can be integrated in articles. Such articles can be of various shape, function and art.

A first type of articles comprises articles that are counterfeited very much. Such articles usually carry a well-known trademark and examples are for instance clothes, perfume, shoes, watches, consumer electronics and the like.

A second type of articles consists of those of which a consumer cannot see at the outside whether they are valid, or which should be considered as coupons with which an account can be uploaded. Examples include cards with which a prepaid account of a mobile telephone can be increased.

A third type of articles consists of those articles that could be used more often, but of which it is not allowed to use them more often. An example is a software license. A preferred example thereof is that the article is a record carrier with the information that is to be read only after authentication with the identification code, the semiconductor device being present in or on the record carrier. The integration of a semiconductor device in a record carrier is known per se, for example from WO-A 02/25582.

A fourth type of articles comprises articles that circulate very much and of which an authority in the field of the articles, would like to detect specific types of use or misuse, although the holder of the article is unknown. Examples are for instance banknotes, passports and other security documents. The memory of the system of this type of articles comprises a zeroth section and a third section each containing information different from the identification code, the zeroth section being accessible before the first code part has been erased and the third section being only accessible after the first code part has been erased.

A fifth type of articles are smart cards. The memory of the semiconductor device thereof contains financial data or other data related to a specified person. The semiconductor device is in such an application preferably provided with bond pads, which allow access to the semiconductor device from contacts or an antenna at the smartcard. At the same time, the bond pads allow probing. This gives to a hacker or any other malicious person a relatively easy access to the data on the smartcard. By using the invention for the semiconductor device in a smart card, this can be prevented. Access will be given to the second section of the memory when the bond pads are probed. At the same time, the first code part will be erased. This has as results that the smart card is not valid anymore due to said erasure, and that the hacker is provided with an identification code that is not the correct code. The second and third section of the memory will contain only fake data. Further on, use of a smartcard that has been probed will be traced automatically once a contact is established between the semiconductor device in the smartcard and any central database.

In another embodiment of the system of the invention, it comprises at least two separate objects. Therein, the memory is provided in a record carrier, the first and the second section thereof having each a position on the record carrier, the record carrier being provided with information that is to be read only after authentication with the identification code. The connection means comprise an index of the record carrier indicating the positions of the first and second section, and the connection means comprise a microprocessor that is present in a reader for the record carrier to allow reading and erasure of the first and second sections.

In this embodiment, the connection means comprise an index, since the first and second sections of the memory will be present anywhere in the memory. Preferably they are spread over the memory. Contrarily to a memory in a semiconductor device, a record carrier—a record carrier with an optically readable memory in particular—is accessible at many locations on the memory. In order to read parts of the memory it is not necessary to enter the memory through an entrance unit. It should thus be prevented that the read-once part of the memory is skipped. By means of spreading the sections, the chance of skipping them become neglegible. This is in particular the case, if a plurality of sections is present. Examples of record carriers include a record carrier having an optically readable memory; a magnetic hard-disc; a memory integrated circuit.

The record carrier is for example an optical disc for storage and/or recording purposes, such as the CD, CD-ROM and DVD-RW. A problem, especially with record carriers that comprise contents, is that these contents should not be copied unauthorized. Thus, if any customer buys only one license, he should be able to use the contents of the record carrier only once. The system of the invention provides means to ensure that the record carrier is read only once, or another limited number equal to the licenses provided. It further may be used to ensure that the record carrier is used for one reader only.

It is a second object of the invention to provide a method of the kind described in the opening paragraph with an improved and simple authentication procedure.

The second object is realized in that the reader compares the identification code with the reference code, comprising the steps of:

reading the first code part from the first section of the memory of the system of the invention and storing it;

erasing the first code part;

reading the second code part from the second section of the memory;

constructing the identification code from the first and the second code part;

comparing the identification code with the at least one reference code; and authentifying the article only, if the identification code and the reference code correspond.

In the method of the invention, use is made of the system of the invention to check the status of the article. The term 'status' is meant therein to include the status of a user's rights to the article and or to any information on the record carrier. This is especially of importance with respect to software and other digital data on a record carrier, for which a user has acquired a single license only. The term is also meant to include the status of the article, i.e. whether the article is unused and/or valid. This is for instance important with respect to telephone cards and like items, that can be used once, and of which the validity cannot be checked in a visible manner. The term is further meant to include the authenticity of the article, i.e. whether an article indicated with a trademark originates from the trademark owner.

With the method of the invention, an improved resistance is offered against illegal use or copying of data, articles, designs and the like. In fact the status of the article or record carrier can be checked directly. Further on, if the status is not correct, a measure can be taken immediately, i.e. not giving access to available information, or giving the information to the customer enabling him to reject the article.

The information regarding the status of the article or the record carrier may be stored, for example in the reader or eventually in the transponder. Further on, it may be transferred to a central database, optionally including information about the legal or illegal use. Also, the status of the article may be shown to the customer or user in various manners, including the display of a message or a color signal. Alternatively, a signal may be shown only in the cases, wherein the status is not approved.

In an advantageous embodiment a substitute code is provided in the memory of the system after erasure of the first code part, the substitute code being an encrypted version of the first code of which the encryption is dependent on the reader. This embodiment is especially suitable, if the article to be protected is a record carrier with contents that are meant to be used by a single user only. The substitute code identifies the reader. After the provision of such a substitute code, the record carrier will operate only in connection with the specific reader.

For example: a customer that has acquired a record carrier, loads the contents thereof in a memory of the reader. Such a reader is for example a personal computer, or a digital video disc player. While loading the contents, the first code is read by the reader and stored in its memory. The first code in the memory at the record carrier is then erased and a third code is stored therein. This third code is an encrypted version of the first code, of which the encryption is preferably based on an identification number of the reader. The second code can only give access to the contents in combination with the first code. Thus, only the reader having the first code can get access to the contents. Such a method is preferably used with a transponder integrated in a record carrier.

These and other aspects of the semiconductor device, the transponder, the article and the methods of the invention will be further elucidated with reference to the drawings, in which.

Figure 5:
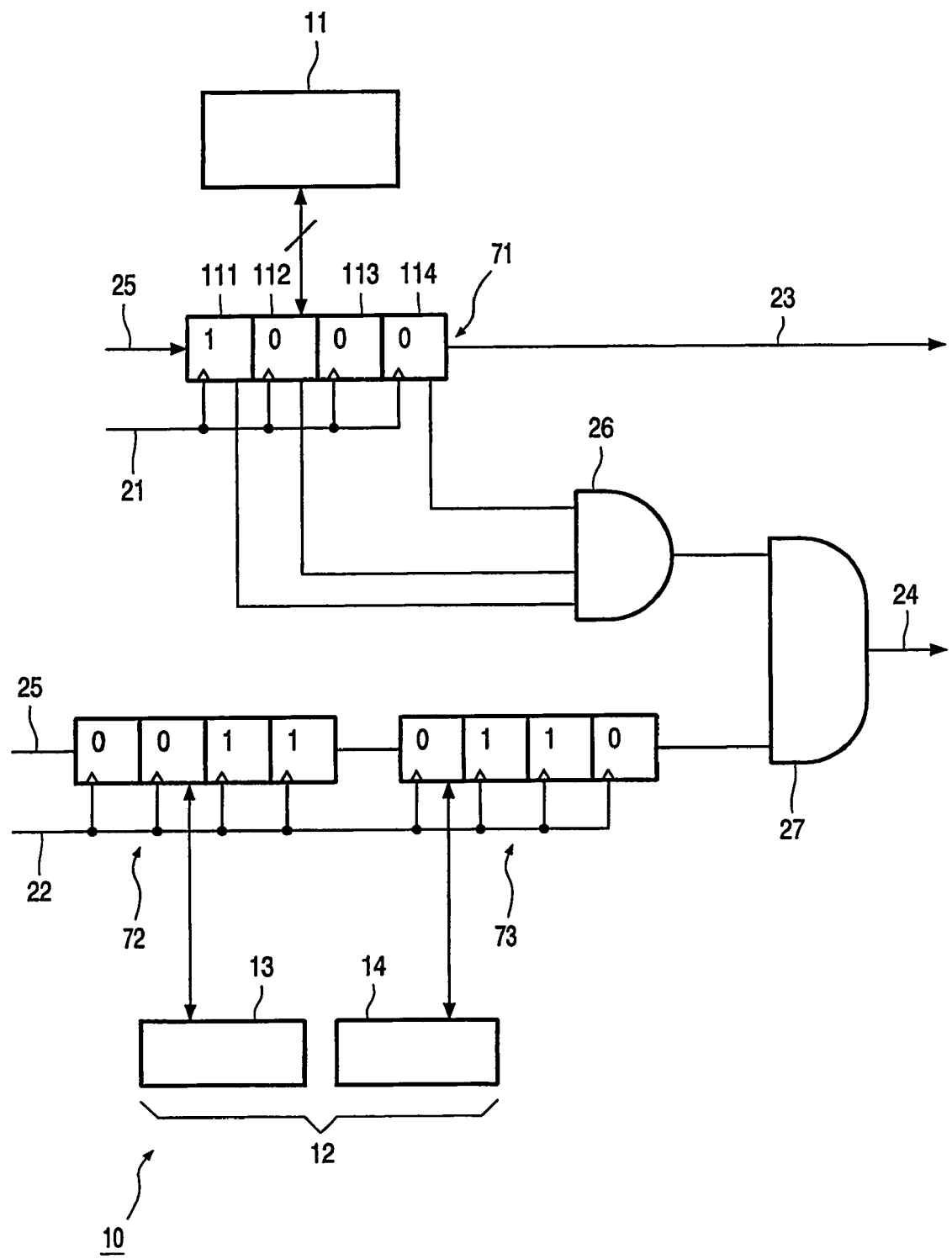

FIG. 5 shows a schematic diagram of a third embodiment the memory of the semiconductor device; and The figures are schematical in nature and disclose only embodiments. Modifications and variations within the scope of the present application will come to the mind of the skilled person easily. The same reference numbers are used in the various figures for the same or similar parts.

Figure 1:
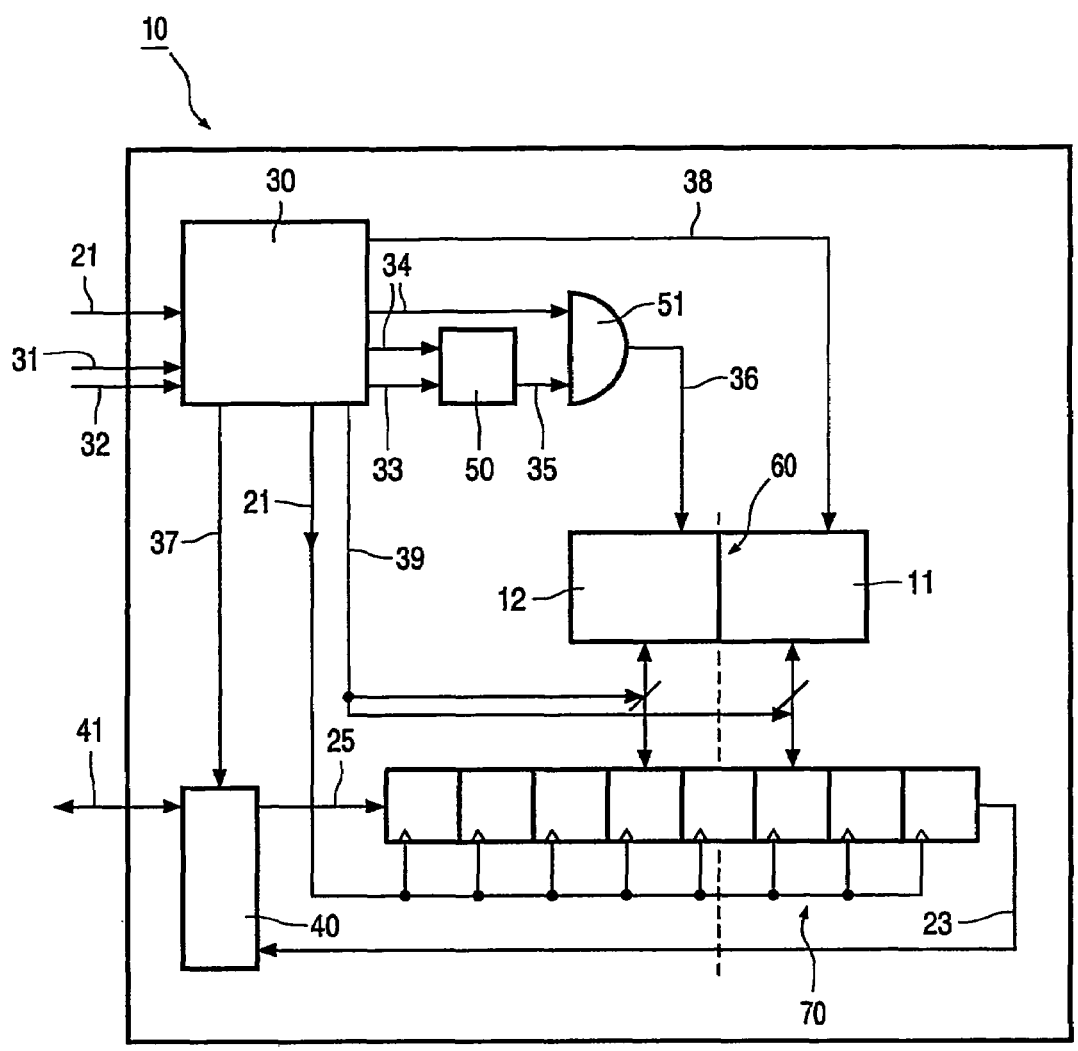
FIG. 1 shows a schematic diagram of a first embodiment of the memory of the semiconductor device.

FIG. 1 shows a first embodiment of the memory 10 of the device of the invention, in particular a semiconductor device. The memory 10 comprises a sequencer 30, a read control unit 50, a non-volatile memory unit 60, a serial memory unit 70 and a multiplexer 40. The non-volatile memory unit 60 can be divided into a first section 11 and a second section 12. It is connected via bidirectional busses to the serial memory unit 70.

The memory works as follows: a clock signal 21 is received by the sequencer 30, together with two input signals 31,32. These signals 21,31,32 generally originate from the card reader. The input signals 31,32 may be bits and are used as control code. The sequencer 30, which is based on a clock counter, generates a number of internal control signals 33,34, 37,39 that are needed to carry out the writing of an identification code into the first and second sections 11,12 of the memory; the reading out of the first code part from the first section 11; and the destruction of the first code part and the reading out of the second code part from the second section 12.

In order that the memory works adequate, it must be write-once at least partially. This is realized in the combination of the Read Control 50 and the consecutive AND-structure 51. The Read Control 50 is fed with two control signals: the write/read control signal 34 and the write-once control signal 33. The same write/read control signal 34 is fed to the AND-structure 51 as well. If the write/read control signal 34 states writing and the write-once control signal 33 is positive as well, then the Read Control 50 will have a high output signal to the AND-structure 51, unless certain conditions. In this case the AND-structure has two high-input signals 34,35, and the output signal 36 of the AND-structure can give the order 'write'.

Under certain conditions the Read-Control 50 will have a low output signal to the AND-structure 51 anyway, therewith explicitly forbidding the writing of the memory unit 60. This conditions are that a one-time programmable write/read bit present in the Read-Control is programmed to reading. A more elaborate embodiment of the Read Control 50 will be discussed with reference to FIG. 2.

Figure 2:
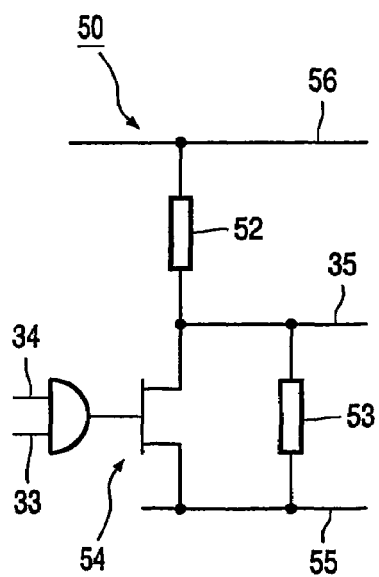
FIG. 2 shows a detail of FIG. 1

FIG. 2 shows an example of the Read Control 50. It comprises an AND-structure, and further a NMOS transistor 54, a low resistance fuse 52 and a high resistance 53. The structure is present between a $V_{DD}$-line 56 and a $V_{SS}$-line 55. If any of the input signals 33,34—e.g. the write-once control signal 33 and the write/read control signal 34—is low, the NMOS transistor 54 is off and the output signal 35 is pulled high by the resistance 52. If both input signals 33,34 are high, the NMOS transistor 54 pulls a high current down from $V_{DD}$. The current passes through the low resistance or fuse 52, blowing it. After the fuse 52 has been blown, the output signal 35 is always kept low by the pull down resistance 53.

Returning to FIG. 1, we will discuss the non-volatile memory unit 60. The non-volatile memory unit 60 includes the first section 11 that is in this embodiment meant to contain a public code, and the second section 12 that is in this embodiment meant to contain a secret code. The memory unit 60 further includes means to upload or download its contents. On asserting an erase signal 38 from the sequencer 30 to the non-volatile memory unit 60, the first section 11 contains $N_p$ bits can be erased. This erasure can be done irrespectively from the state of the W/R-bit. The memory unit 60 preferably has an intrinsically write-once architecture like a fuse or ROM bank. The erasure operation is equivalent to blowing or programming all cells of the first section 11.

The serial memory unit 70 is N bits long, wherein N is larger than $N_p$. The serial memory unit 70 allows writing and reading data from a single contact; in the case that the semiconductor device with the memory 10 is contained in a smartcard, this single contact may be a single pin. The serial memory unit 70 is connected to the non-volatile memory unit 60 so that the data stored in the serial memory unit 70 can be (in parallel) uploaded to the first and second sections 11,12 of the memory unit 60. Alternatively, depending on suitable control signals 39, the data in the memory unit 60 can be downloaded to the serial memory unit 70. This first section 11 that is to be erased, is connected to the $N_p$ bits of the serial memory unit 70 that are closer to the output 23. In order to shift in or out the data 41 from or to the external world, the serial memory unit 70 needs a clock signal 21, that is provided through the sequencer 30.

The three data operations—writing, reading of the public code and reading of the secret code will be discussed in more detail in the following:

writing: The external control signals 31,32 tell the sequencer 30 that the identification code must be written in the non-volatile memory unit 60. The sequencer 30 connects via the bi-directional multiplexer 40 the input 25 of the serial memory unit 70 to the input/output data pin 41. Using the clock signal 21, which the sequencer 30 passes to the serial memory unit 70, the two codes are written in the sequential memory one after the other, the public code first. After N clock cycles, when all the bits of the code were transferred to the serial memory unit 70, the sequencer 30 stops passing the clock to the serial memory unit 70, sets the W signal high and uploads the content of the serial memory unit 70 to the first and second sections 11,12 of the memory unit 60. The uploading does not need an external clock, and is effected by sending a control signal 39 to the busses between the serial and the non-volatile memory units 60,70. After a certain delay, which ensures a correct upload of the non-volatile memory unit 60, the sequencer 30 sets high the write-once control signal 33, and the non-volatile memory unit 60 is prevented from further writing, with the mechanism described above.

reading the public code: The external control signals 31,32 tell the sequencer 30 that the public code must be read out. The sequencer 30 connects the output of the serial memory 25 to the input/output pin 41 via the multiplexer 40. The content of the non-volatile memory unit 60 is downloaded to the serial memory unit 70. This operation does not need an external clock. When the serial memory unit 70 contains the public and secret code, the data are shifted out, starting with the public code, at the pace given by the external clock. After the sequencer 30 counts Np clock cycles all the P code is sent out, and the sequencer 30 stops sending clocks to the serial memory unit 70. In this way only the P code is unveiled.

reading the secret code: The external control signals 31,32 tell the sequencer 30 that the secret code must be read out. The sequencer 30 sends out the ERASE signal 38 and destroys the public code contained in the first section 11 of the memory unit 60 containing Np bits. The sequencer 30 then starts the same downloading procedure described with reference to the reading of the public code. This means that in the serial memory unit 70 the public code will now be all ones. The serial memory output 23 is again connected to the input/output data pin 41 via the multiplexer 40. At the pace of the external clock, the content of the serial memory unit 70 is shifted out the memory 10. Its first Np bits will be all ones, the following Ns bits are the secret code that is now unveiled.

Figure 3:
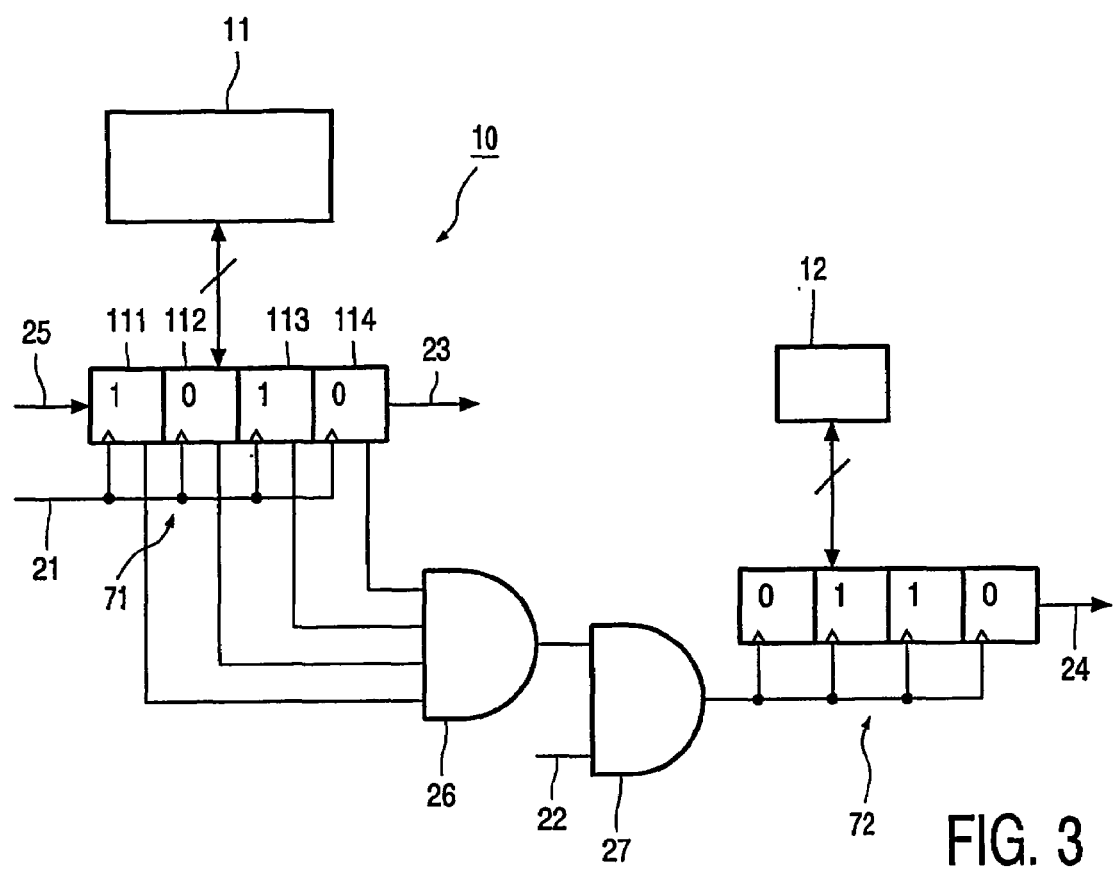
FIG. 3 shows a schematic diagram of a second embodiment of the memory of the semiconductor device in a first state.

FIG. 3 shows a schematic diagram of a second embodiment of the memory 10 of the semiconductor device, that is in a first state. The memory 10 of this embodiment is operated similarly to the memory 10 of FIG. 1. In this figure, only the serial memory—divided into parts 71 and 72—and corresponding sections 11,12 of the memory unit 60 are shown. The memory 10 comprises a first section 11 and a second section 12, clock signal inputs 21,22, outputs 23,24 to a reader, input 25 of the serial memory 70, and connection blocks 26,27. The first section 11 is in this example read-once, whereas the second section 12 is read-many. Before the serial memory parts 71,72 can be read out, the data must be loaded from the corresponding first and second section 11,12. The connection blocks 26,27 are AND-elements and further preferably include a flip-flop to synchronize the signals from the memory elements in the serial memory parts 71,72. In order to assure that signals are received the one after the other by the reader, any kind of—not-shown—switch is present either after the memory to switch between outputs 23,24 or before the clock signal inputs 21,22, to provide a desired delay to the signal input 22.

After loading the serial memory parts 71,72, an input 25 will be sent to the first section 11 by the (not-shown) multiplexer 40. At the same time a clock signal provided via input 21 to the individual memory elements 111–114 of the serial memory part 71. These memory elements 111–114 will provide their contents to the output 23. After being erased, the memory elements 111–114 will provide their contents to connection block 26 as well. Only if all elements 111–114 are being erased, the connection block 26 will provide a signal "one" to a second connection block 27. In this block 27, the signal from clock signal input 22 will be handled to the second serial memory part 72 only if the signal from connection block 26 is one. Then the second serial memory part 72 can be read. The identification code being read is in this example 10100110, and it will provide the requested authentication.

Figure 4:
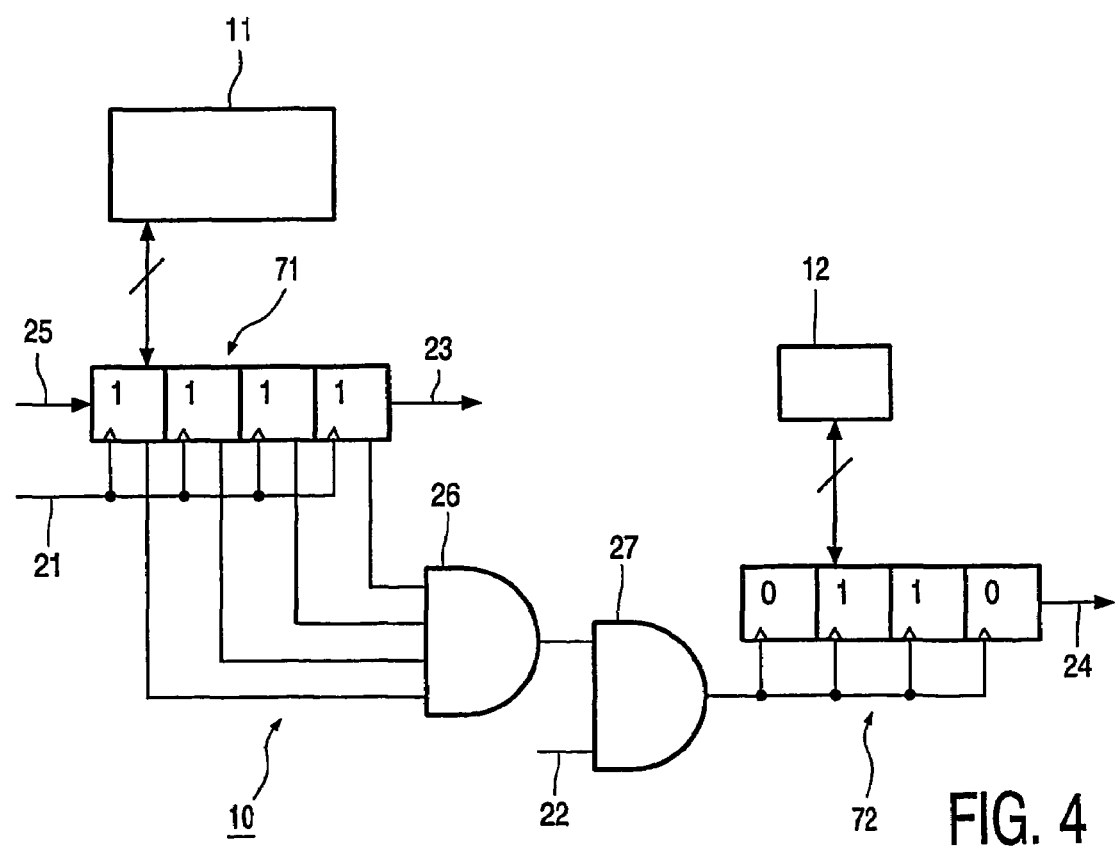
FIG. 4 shows a schematic diagram of a second embodiment of the memory of the semiconductor device in a second state.

After having read the data of the second section 12, the contents of the memory 10 can be read again. This is shown in FIG. 4. In this case, the identification code will be 11110110. This identification code can be programmed that no access to an article is given. However, if connected to a central database, the identification code can at the same time provide a connection for an independent contact between the authentic producer of the sold good and the customer that has bought the good.

FIG. 5 shows a third embodiment of the memory 10. In this figure only the sections 11,12 of the memory unit and the serial memory parts 71,72,73 are shown. The operation of the memory 10 is in essence further equal to the memory 10 of FIG. 1. In this embodiment the first section 11 is read many, and the second section 12 contains a first set 13 of memory elements, and a second set 14 of memory elements. The first set 13 is read-once, whereas the second set 14 is read-many. The connection blocks 26,27 are connected slightly different in comparison with the first embodiment, and are now embodied as AND-elements. The connection block 26 will only provide a signal, if all inputs to the block are high ('1'). The inputs of connection block come from the memory elements 111,112 and 114 only. This means that the status of memory element 113 is not relevant for the access to the second section 12. Also, it is not necessary that this memory element 113 is erased. The connection block 27 will provide an output 24 if the input from connection block 26 is high ('1').

Before access to the second section 12, the identification code being read out will be 1000 0000 0000. When getting access to the second section 12 for the first time, the identification code will be 1000 0011 0110. Thereafter, the identification code will be 1101 1111 0110, or—depending on the specific programming of the first section 11—1111 1111 0110. These three codes can give access in different ways. Alternatively, the code 1101 1111 0110 may be used as a new identification code for an article such as a bank note, which originally had the code 1000 0000 0000.

As will be understood, the invention can be embodied in various ways. If the memory is in a semiconductor device, the first and second section of the memory can be connected through one AND-element or a hierarchy of AND-elements. The read-once memory may be implemented with fuses. However, also any other type of non-volatile memory can be used, such as DRAM, MRAM, shift registers and the like. If the first section of the memory is read-many a signal is necessary with which data of the first section are erased, so as to enable reading of the second section. This signal is for instance a pulse originating from the reader. Preferably, a clock signal is sent a plurality of times to the read-once memory, which plurality corresponds to the plurality of memory elements in the first and the second section. If the second section is not accessible, blank or random digits can be produced. The clock signal can be generated on the transponder, but is preferably generated in the reader.

Further on, it is not necessary, that the identification code is always divided in the same way over the first and the second section of the memory. Also, the length of the second section does not need to be equal to that of the first section, as is necessary in the prior art memory. In case that the second portion of the memory is not accessed, it can be substituted by an equal number of standard or randomly chosen digits. These digits may vary from one semiconductor device to another. Hence, it will not or not easily become clear to a malicious person, what is the length of the first section and what is the length of the second section. In order to increase the security of the memory of the invention, the identification code may be provided such that different decryption methods are necessary for reading of the first and the second section of the memory.

Summarizing, the system, embodied in a device, of the invention comprises a memory with a first section and a second section. The second section can be read only after erasure of the first section. The memory is suitable for authentication purposes, in that the first section contains a first code part and the second section contains a second code part of an identification code. The device is preferably an semiconductor device and can be integrated in articles and in record carriers.

The invention claimed is:

1. A system comprising:
a memory that includes a first and a second section,
a sequencer that is configured to provide read-access to the first and second sections, wherein:
the first section is configured to store a first code part of an identification code,
the second section is configured to store a second code part of the identification code, and
the sequencer is configured to provide access to the second section only if the first code part in the first section has been erased from the memory.

2. The system of claim 1, wherein
the first code part in the first section is configured to be read once only and
the second code part in the second section is configured to be read more than once.

3. The system of claim 1, wherein:
the first code part in the first section is configured to be read more than once,
the second code part in the second section is configured to be read only once,
the memory includes a third section that is configured to be read more than once, and
the sequencer is configured to provide access to the third section only after the first code part in the first section has been erased.

4. The system of claim 1, wherein
the memory and the sequencer are incorporated in a semiconductor device.

5. The system of claim 1, including
an antenna that is configured to communicate contactlessly with a reader.

6. The system of claim 1, including
a record carrier provided with information that is to be read only after an authentication based on the identification code.

7. The system of claim 1, wherein:
the system includes a carrier, and
the memory includes a zeroth section and a third section, each containing information different from the identification code,
the zeroth section being accessible before the first code part has been erased and
the third section being only accessible after the first code part has been erased.

8. The system of claim 1, wherein:
the memory is provided in a record carrier,
the first and the second section thereof having each a position on the record carrier,
the record carrier being provided with information that is to be read only after authentication with the identification code,
the sequencer includes:
an index of the record carrier indicating the positions of the first and second section, and
a microprocessor that is present in a reader for the record carrier and is configured to allow reading and erasure of the first and second sections.

9. The system of claim 8, wherein
the index is present on the record carrier in an encrypted format, and
the microprocessor is configured to decrypt the index.

10. The system of claim 1, including
a shift register that is configured to couple the memory to an output of the system.

11. The system of claim 10, wherein
the sequencer is configured to load the first and second sections to the shift register, so as to provide the first and second sections to the output in series.

* * * * *